May 27, 1969 J. F. SPRINGER, JR 3,446,973
SHIFT REGISTER DIRECTLY SETTABLE BY OPTICAL MEANS
Filed July 14, 1966
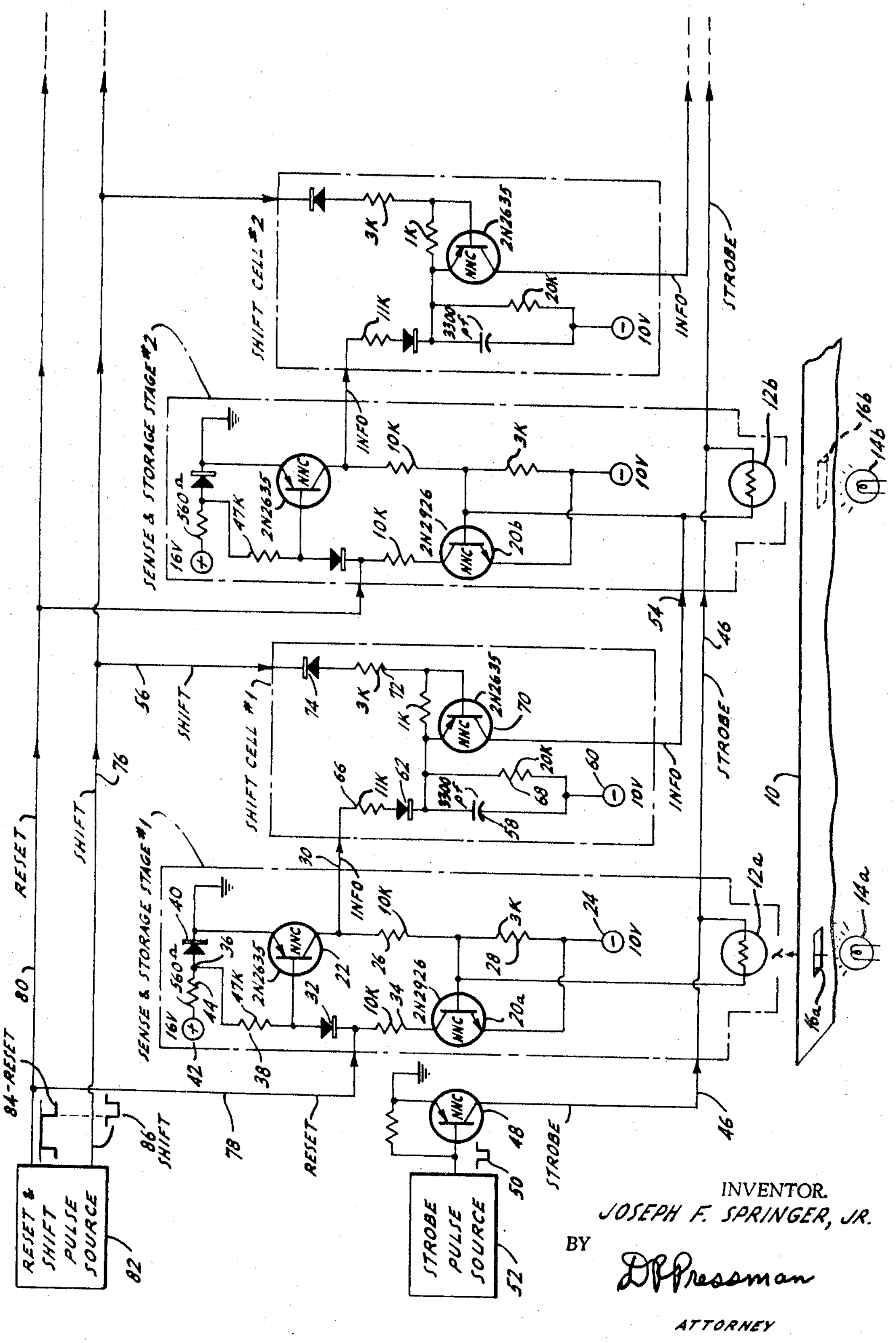
INVENTOR.
JOSEPH F. SPRINGER, JR.
BY D P Pressman
ATTORNEY 3,446,973

SHIFT REGISTER DIRECTLY SETTABLE BY OPTICAL MEANS

Joseph F. Springer, Jr., Philadelphia, Pa., assignor to Philco-Ford Corporation, Philadelphia, Pa., a corporation of Delaware Filed July 14, 1966, Ser. No. 565,316
Int. Cl. H01j *39/12*
U.S. Cl. 250—208 10 Claims This invention relates to shift registers and more particularly to a novel shift register in which each stage thereof is directly settable by means of an optical input thereto.

In one form of digital information sensing system, a plurality of light sources are selectively illuminated according to the particular information which is represented in digital form. For example, an opaque card, which stores information by means of selectively punched holes, may be positioned between a light or bank of lights and a bank of photocells positioned to correspond to the possible hole locations on the card. The photocells which are adjacent punched holes will receive a light input, whereas the remainder of the photocells will not. Accordingly, the illuminated photocells will provide an electrical output in parallel digital form.

Prior to being sent to data utilization means, the parallel digital electrical output from the photocells often must be stored temporarily and must thereafter be supplied in serial form as sequential pulses to the data utilization means. Previously, such temporary storage and serial output was effected by means of a multistage shift register and respective threshold circuits and amplifiers connected between the output of each photocell and the stages of the shift register. Strobing means were provided to connect the outputs of the threshold circuit to the stages of the shift register at the desired time. This type of system was awkward in requiring the use of separate threshold circuits and amplifiers to sense and amplify the output of the photocells and to set the respective stages of the shift register. In addition, the output pulses of the threshold circuits and shift register did not have a fast rise time. The shift register required to process the digital information required many components and complicated circuitry, and drew a relatively large amount of current. The present invention overcomes these drawbacks by providing a shift register which is directly photosettable and which utilizes simpler circuitry, fewer components, and less current.

Accordingly several objects of the present invention are: (1) to provide a new and improved shift register, (2) to provide an optical data sensing, temporary storage, and serial readout system which does not require separate threshold circuits or amplifiers and which utilizes a minimum of current and components, and (3) to provide such a system in which the output pulses have an improved form. Other objects and advantages of the present invention will become apparent from a consideration of the ensuing description thereof.

*Summary*

According to the present invention the shift register comprises a plurality of bistable stages, each of which may be directly set by means of a respective photocell. A plurality of interstage shift cells, each comprising a shunt storage means and a series gate, are utilized to shift information from each stage to the next adjacent stage.

*Description of system*

The single figure of drawing shows a partly schematic and partly pictorial diagram of a photosettable shift register system according to the present invention. Values or identifications of electronic components of one satisfactory embodiment of the invention are indicated on the drawing.

The system is arranged to read digital information stored in the form of holes on a punched card 10. Such information is read by means of photocells, such as 12*a* and 12*b*, which are arranged to sense light passing from sources such as 14*a* and 14*b* through holes such as 16*a* in card 10. Since there is no hole in card 10 at location 16*b*, light from source 14*b* will be unable to pass through the card at this point and consequently no input will be sensed by the corresponding photocell 12*b*. The presence of a hole such as 16*a* may indicate one binary number, such as a one, and the absence of a hole, e.g., at location 16*b*, may indicate another binary number, such as a zero.

Although the invention is shown for exemplary purposes as utilizing an optical input in the form of plurality of light sources such as 14*a* and 14*b* together with a punched card 10, it will be apparent that many other types of digital optical inputs can be sensed by this system. For example, a single light source may be employed to illuminate all possible hole locations in card 10. Alternatively, the digital input may be in the form of individual light sources only which are either illuminated or dark according to the digital information represented.

Photocells 12*a* and 12*b* may be photosensitive transistors, photosensitive diodes, or any other type of photosensitive impedances which are arranged to assume a different, e.g., lowered, impedance in response to illumination thereof. One suitable type of photocell is a TI LS–400 photodiode. Alternatively a photocell of the type which is arranged to generate an output voltage in response to illumination thereof, such as a cadmium sulfide photocell, may be utilized.

Photocell 12*a* forms part of a sense and storage stage #1 which includes, in addition to the photocell 12*a*, a flip-flop or bistable circuit comprising transistors 20*a* and 22. The emitter of NPN transistor 20*a* is connected to one terminal of a negative source 24 and the collector of PNP transistor 22 is connected to the same terminal of source 24 via series-connected resistors 26 and 28. The base of transistor 20*a* is connected to one terminal of photocell 12*a* and to the junction of resistors 26 and 28. The collector of transistor 22 forms an information output terminal 30 for stage #1. The emitter of transistor 22 is connected to the other terminal of source 24 (ground) and the base thereof is connected to the collector of transistor 20 by way of diode 32 and resistor 34. The anode of diode 32 is connected, by way of resistor 38, to a point 36 which is maintained slightly above ground potential. Point 36 is connected to ground by means of diode 40 which is forward biased by means of positive source 42 and resistor 44. The potential of point 36 is greater than that of ground by the forward drop across diode 40. This is about 0.7 volt for a silicon diode. It was found that connecting the upper terminal of resistor 38 to a slightly positive potential point improved the operation of the system; however the upper terminal of resistor 38 may be connected directly to ground with satisfactory results.

The other terminal of photocell 12*a* is connected to a strobe bus 46. Bus 46 is connected to ground by way of the collector-emitter circuit of a strobe transistor 48 which is normally nonconductive (NNC) but which is arranged to become conductive and thereby connect bus 46 to ground in response to a negative strobe pulse such as 50 from strobe pulse source 52.

Sense and storage stage #2 is identical to stage #1 except that additionally it includes an information input lead 54, connected to the base of the stage's NPN transistor, 20*b*, for receiving information shifted from stage

#1 by way of shift cell #1. As many stages as is desired may be utilized in the system. For example, twelve identical stages may be employed to read a column of a standard punched card.

Shift cell #1 receives information from stage #1 by means of lead 30 and supplies said information to stage #2 in response to a shift input pulse such as 86 on shift bus 76. Bus 76 is connected to cell #1 by way of lead 56. Cell #1 includes a shunt storage capacitor 58 which has one electrode connected to a negative source 60 (which may be the same source as source 24) and which has another electrode connected to terminal 30 by means of diode 62 and resistor 66. Capacitor 58 is paralleled by a resistor 68 which provides a discharge path for capacitor 58. The upper electrode of capacitor 58 is connected to input terminal 54 of stage #2 by way of the collector-emitter circuit of a gating transistor 70 whose base is connected to shift input lead 56 by way of resistor 72 and diode 74.

Cell #2 and each subsequent cell are, of course, identical to cell #1. Each cell is arranged to store information from a preceding stage, and in response to a shift pulse, to transfer such information to a subsequent stage. All shift cells are arranged to operate in unison and their shift input terminals such as 56 are connected in common to shift bus 76. The output of the register will be supplied in serial form at the output terminal of the last shift cell.

Each stage includes a reset lead such as 78 which, when connected to ground, will cause the flip-flop of each stage to assume a selected one of its two possible stable states. In the embodiment shown in the drawing, placing reset terminal 78 at ground potential causes transistors **20*a* and 22 of stage #1 to be non-conducting. All the reset terminals are connected in common to a reset bus 80**.

The reset and shift buses 80 and 76, respectively, are driven by a reset and shift pulse source 82. In operation of this system information is shifted from each preceding stage to each subsequent stage by raising the potential of bus 80 to ground potential for about 10 μs duration as indicated by the reset pulse 84. This is followed by a negative shift signal of about 2 μs. duration, as indicated by shift pulse 86, on shift bus 76. As indicated by the broken line interconnecting the trailing edge of pulse 84 with the leading edge of pulse 86, pulse 86 should immediately follow and desirably be triggered by the trailing edge of pulse 84. Information is shifted down and "out of" the register by repetitively supplying a sufficient number of groups of pulses such as 84 and 86 to the reset and shift buses.

*Operation of system*

In operation of the system the light sources such as **14*a* and 14*b* are normally illuminated. The card 10 is inserted in position, either manually or automatically, so that the photocells such as 12*a* and 12*b* are selectively illuminated according to the information stored in the card by means of punched holes such as 16*a*. The strobe pulse source is then actuated, either manually or automatically, causing transistor 48 to become conductive, thereby connecting strobe bus 46 to ground. Those photocells such as 12*a*** which receive an optical input will be low in impedance or otherwise generate an electrical output which will "set" the flip-flop associated therewith.

The flip-flop comprising transistor **20*a* and 22 is normally reset, i.e., transistors 20*a* and 22 are normally nonconductive. No current flows through the collector-emitter circuit of either transistor and hence the base of transistor 20*a* will be at the same potential as negative source 24 and the base of transistor 22 will be at the same potential as point 36**.

The light input from source **14*a* will lower the impedance of photocell 12*a* and allow a significant amount of current to flow from ground, through transistor 48, photocell 12*a* and resistor 28 and the base-emitter circuit of transistor 20*a* to source 24. This will raise the potential of the base of transistor 20*a*, turning transistor 20*a* on. Current will thus flow from point 36 through resistor 38, diode 32, resistor 34, and the collector-emitter circuit of transistor 20*a* to source 24, thereby providing a negative potential at the junction of resistor 38 and diode 32. This negative potential will turn transistor 22 on, allowing current to flow from ground through the collector-emitter circuit of transistor 22, resistor 26, and resistor 28 to source 24. The potential at the junction of resistors 26 and 28 will thus rise toward ground to maintain transistor 20*a* conductive and the flip-flop will remain in the "set" state wherein transistors 20*a* and 22** are both conductive.

In the initial reset stage, wherein transistors **20*a* and 22 are nonconductive, the potential at output terminal 30 will be negative, but in the set state the potential on lead 30 will be substantially at ground potential. When the potential on lead 30 is negative, no charge will be placed on capacitor 58 since both electrodes thereof are connected to a negative source. However when the flip-flop is set, a charge will be placed on capacitor 58 by current flowing from ground through the collector-emitter circuit of resistor 22, resistor 66, and diode 62. Accordingly, if a binary one is supplied to stage #1, the flip-flop will be set and cell #1 will store a binary one. If a binary zero is supplied to stage #1, the flip-flop will not be set and no charge will be placed on capacitor 58** so that cell #1 will "store" a binary zero.

After the digital information from card 10 is read into the register by causing strobe source 52 to supply an output, the information will remain in the register as long as desired. When it is desired to read the information out of the register in conventional serial form, or to shift the information to subsequent stages in the register, reset and shift pulse source 82 is actuated, either manually or automatically, so that reset and shift buses 80 and 76 will be sequentially energized with positive and negative pulses as shown at 84 and 86, respectively. As explained before, reset pulse 84 raises the potential of bus 80 to ground and shift pulse 86 lowers the potential of bus 76 to a negative value. Each time the pair of pulses 84 and 86 are produced, the information stored in the register will be shifted one stage to the right in the manner now to be described.

Assume that stage #1 has been set. The pulse 84 on reset bus 80 will be supplied, via lead 78, to the junction of the cathode of diode 32 and resistor 34. This will raise the potential of this point to ground and stop the regenerative action of the flip-flop, allowing it to revert to the reset state wherein transistors **20*a* and 22 are nonconductive. The potential on output lead 30 of stage #1 will thus return to a negative value, but capacitor 58 will not discharge via lead 30 due to the blocking action of diode 62 which will now be reverse-biased. Capacitor 58 will not discharge appreciably through resistor 68 in the short time interval represented by pulse 84**.

Following pulse 84, the negative shift pulse 86 applied on bus 76 will be supplied to the base of gating transistor 70 via lead 56, diode 74, and resistor 72, thereby turning transistor 70 on and creating a low impedance path between the upper electrode of capacitor 58 and input lead 54 of stage #2. Current will thus flow from capacitor 58 through transistor 70 and lead 54 into stage #2. This will raise the base potential of transistor **20*b*, thereby setting stage #2 in the manner in which stage #1 was set. Further pairs of pulses 84 and 86** will repeat the aforedescribed shifting action so as to shift the information originally in stage #1 to stage #3 (not shown), and so on in the manner aforedescribed.

The photosettable shift register of the invention has been operated successfully and has been found to deliver output pulses having a faster rise time than previous arrangements which utilize a threshold type circuit to sense the output of the photosensitive means and set the stages of the register. Each stage of the register has a very low number of components in relation of prior art arrangements. The circuit has been found to be extremely reliable. In addition, since both transistors 20 and 22 of the flip-flops are normally nonconductive, very little current is utilized.

While there has been described what is at present considered to be the preferred embodiment of the invention it will be apparent that various modifications and other embodiments thereof will occur to those skilled in the art within the scope of the invention. Accordingly, it is desired that the scope of the invention be limited by the appended claims only.

I claim:

1. A shift register, comprising:

(a) two bistable stages, each having (1) an input terminal to which application of a predetermined signal will cause said stage to switch to a second stable state when said stage is in a first of its stable states, and (2) an output terminal for supplying a different voltage for each of said stable states, (b) means for selectively supplying said predetermined signal to said stages, (c) a shift cell connected between the output terminal of a first of said bistable stages and the input terminal of a second of said bistable stages and including (1) a storage capacitor having a first electrode connected to a fixed potential point and a second electrode coupled, via a diode, to the output terminal of said first bistable stage and (2) gating means connected between said second electrode and the input terminal of said second bistable stage for connecting said second electrode to said input terminal of said second bistable stage in response to a shift input signal thereto, and (d) means for resetting said bistable stages in their said first stable states and supplying a shift input signal to said shift cell so as to transfer information from said storage capacitor to said second bistable stage.

2. The register of claim 1 wherein each of said bistable stages comprises two transistors of opposite conductivity type, the collector of each being coupled to the base of the other.

3. The shift register of claim 1 further including strobing means for normally blocking said predetermined signal from flowing from said (b) means to said input terminals but allowing said signal to flow in response to a strobe input signal thereto.

4. The register of claim 1 wherein said (b) means comprises (1) two photocell circuits, each including a photocell and arranged to supply said predetermined signal to the input terminal of a respective one of said bistable stages in response to illumination of said photocell, and (2) means for selectively illuminating said photocells.

5. The register of claim 1 wherein said (d) means comprises means for supplying (1) a reset signal to a terminal of each of said bistable stages, said reset signal having an amplitude and polarity to reset each of said bistable stages in its first stable state, and (2) said shift input signal to said shift cell upon termination of said reset signal.

6. A photosettable shift register, comprising:

(a) a first and second photosettable bistable stages, each stage comprising (1) a bistable circuit including a pair of cross-coupled transistors, said circuit including an output terminal and an input terminal, said bistable circuit being arranged to switch from a first to a second stable state when said input terminal is connected, via less than a predetermined impedance, to a point maintained at a predetermined potential, and (2) a photosensitive impedance connected between said point maintained at a predetermined potential and said input terminal, said photosensitive impedance having an impedance greater than said predetermined impedance when not illuminated and having an impedance less than said predetermined impedance when illuminated with a predetermined amount and form of radiant energy, (b) means for selectively setting said stages to one of said two stable states comprising means for selectively illuminating the photosensitive impedance thereof with said predetermined amount and form of radiant energy, and (c) means for setting the state of said second stage to the state previously assumed by said first stage.

7. The register of claim 6 wherein said (c) means comprises (1) a shift cell including storage means and gating means, said storage means connected to the output terminal of said first stage and arranged to store the information in said stage, said gating means arranged to transmit the information in said storage means to the input terminal of said second photosettable stage in response to a shift input signal supplied to said gating means, and (2) means for resetting said photosettable stages to their first stable states and thereafter supplying said shift input signal to said gating means, thereby to transfer information from said storage means to the said second photosettable stage.

8. The register of claim 7 wherein said storage means comprises a capacitor having one electrode coupled to the output terminal of a preceding photosettable cell via a diode and another electrode connected to a point at reference potential, said gating means being connected between said one electrode and the input terminal of said second photosettable stage.

9. The register of claim 7 wherein said bistable circuit comprises a pair of common emitter transistor amplifiers, an output of each amplifier being taken from the collector circuit of the transistor thereof and coupled to the base of the transistor of the other amplifier, said input terminal being connected to the base of one of said transistors and said output terminal being connected to the collector of one of said transistors.

10. The register of claim 6 wherein said (e) means comprises a plurality of light sources, one adjacent each of said photosensitive impedances, and means for selectively transmitting light from each of said light sources to its respective photosensitive impedance.

References Cited

UNITED STATES PATENTS

| | | | |
|---|---|---|---|
| 3,189,745 | 6/1965 | Van Reymerdal | 235—61.11 X |
| 3,361,896 | 1/1968 | Antonio | 250—219 X |

JAMES W. LAWRENCE, *Primary Examiner.*

C. R. CAMPBELL, *Assistant Examiner.*

U.S. Cl. X.R.

235—61.11; 250—214, 219; 307—221, 311